United States Patent
Froeschner et al.

(10) Patent No.: US 9,227,384 B2
(45) Date of Patent: Jan. 5, 2016

(54) PRESSURE DEBULKING SYSTEM

(71) Applicant: The Boeing Corporation, Chicago, IL (US)

(72) Inventors: Neal A. Froeschner, Florissant, MO (US); Derek J. Fox, O'Fallon, MO (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/148,723

(22) Filed: Jan. 6, 2014

(65) Prior Publication Data
US 2014/0116624 A1   May 1, 2014

Related U.S. Application Data

(62) Division of application No. 11/956,793, filed on Dec. 14, 2007, now Pat. No. 8,622,109.

(51) Int. Cl.
*B32B 37/00* (2006.01)
*B29C 70/44* (2006.01)
*B32B 37/10* (2006.01)

(52) U.S. Cl.
CPC ........... *B32B 37/0046* (2013.01); *B29C 70/446* (2013.01); *B32B 37/1018* (2013.01); *B32B 37/003* (2013.01); *B32B 2605/18* (2013.01)

(58) Field of Classification Search
CPC .... B29C 70/44; B29C 51/28; B29C 43/3644; B29C 43/3647; B29C 43/3649; B29C 43/12; B32B 37/1009

USPC ............... 156/285, 286, 380.5, 382; 264/544, 264/546, 571; 425/389
See application file for complete search history.

(56) References Cited

U.S. PATENT DOCUMENTS

| | | | |
|---|---|---|---|
| 2,401,299 A | 6/1946 | Glavin | |
| 2,531,218 A | 11/1950 | Johnson | |
| 3,737,261 A * | 6/1973 | Hardesty | ....................... 425/113 |
| 4,132,048 A | 1/1979 | Day | |
| 4,457,122 A | 7/1984 | Atkins et al. | |
| 4,475,976 A | 10/1984 | Mittelstadt et al. | |
| 5,314,497 A | 5/1994 | Fay et al. | |
| 5,468,140 A | 11/1995 | Hoffman et al. | |
| 5,503,543 A | 4/1996 | Laghi | |
| 5,648,109 A | 7/1997 | Gutowski et al. | |
| 5,718,925 A * | 2/1998 | Kristinsson et al. | ............... 425/2 |
| 5,772,950 A | 6/1998 | Brustad et al. | |
| 5,795,536 A | 8/1998 | Gaworowski et al. | |
| 5,971,729 A | 10/1999 | Kristinsson et al. | |
| 5,972,149 A * | 10/1999 | Schiller et al. | ................ 156/213 |
| 2006/0172111 A1 | 8/2006 | Polus et al. | |
| 2009/0151867 A1 | 6/2009 | Froeschner et al. | |

* cited by examiner

*Primary Examiner* — Timothy Kennedy
(74) *Attorney, Agent, or Firm* — Yee & Associates, P.C.

(57) ABSTRACT

A pressure debulking system includes a debulking chamber having a debulking chamber interior, a pressure bladder having a bladder interior provided in the debulking chamber interior, a vacuum port disposed in fluid communication with the debulking chamber interior and a pressure port disposed in fluid communication with the debulking chamber interior. A pressure debulking method is also disclosed.

15 Claims, 5 Drawing Sheets

PRESSURE DEBULKING SYSTEM

This application is a divisional of application Ser. No. 11/956,793, filed Dec. 14, 2007.

TECHNICAL FIELD

The disclosure relates to debulking of composite layups. More particularly, the disclosure relates to a circumferential pressure debulking system and method for debulking composite layups.

BACKGROUND

During the course of various fabrication processes, including the aerospace industry for example and without limitation, it may be necessary to debulk composite layups. Conventionally, this may be accomplished by applying layers of protective film, breather material and vacuum film over the layup at the fabrication stage which requires debulking. Sealant tape may be applied around the periphery of the part, allowing the vacuum film to be completely sealed. A vacuum port may be installed through the vacuum film. Shop vacuum may be applied to the assembly, allowing vacuum pressure to squeeze and compact the layup. Other devices known as vacuum debulk boxes may apply vacuum pressure from above the layup only.

Conventional methods of debulking composite layups may be time-consuming and laborious. Furthermore, the methods may be required many times throughout the layup process and the materials used in the methods may not be re-used. This may contribute to the overall time and cost of the fabrication process.

Therefore, a circumferential pressure debulking system and method for debulking composite layups which is expeditious and cost-effective is needed.

SUMMARY

The disclosure is generally directed to a pressure debulking system. An illustrative embodiment of the pressure debulking system includes a debulking chamber having a debulking chamber interior, a pressure bladder having a bladder interior provided in the debulking chamber interior, a vacuum port disposed in fluid communication with the debulking chamber interior and a pressure port disposed in fluid communication with the debulking chamber interior.

The disclosure is further generally directed to a pressure debulking method. An illustrative embodiment of the method includes providing a composite layup, providing a chamber having a pressure bladder in the chamber, expanding the pressure bladder by inducing a vacuum in the chamber, placing the composite layup in the chamber and applying the pressure bladder against the composite layup by applying pressure against the pressure bladder.

BRIEF DESCRIPTION OF THE ILLUSTRATIONS

DETAILED DESCRIPTION

The disclosure is generally directed to a circumferential pressure debulking system and method suitable for debulking composite layups in composite fabrication processes. The system and method may be applicable to any of a variety of industries including the aerospace industry, for example and without limitation. The system and method may facilitate the application of circumferential pressure to a composite layup to debulk the composite layup in a manner which is expeditious and cost-effective.

Figure 1:
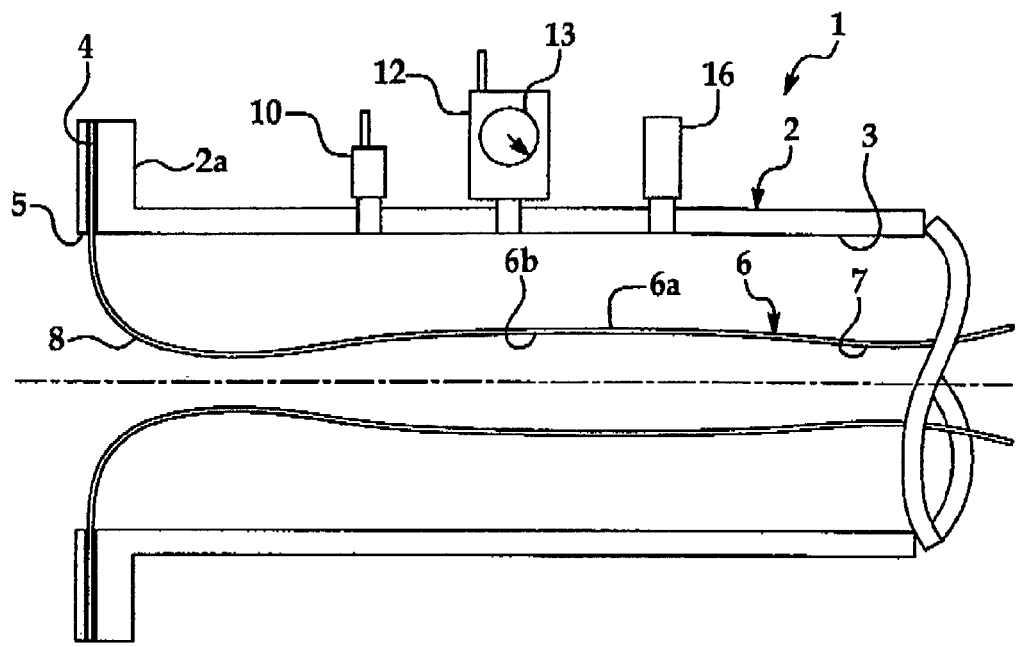
FIG. 1 is a partially schematic sectional view of an illustrative embodiment of the pressure debulking system.

Referring initially to FIG. 1, an illustrative embodiment of the pressure debulking system, hereinafter system, is generally indicated by reference numeral 1. The system 1 may include a debulking chamber 2 having a debulking chamber interior 3. A chamber opening 5 (one of which is shown) may be provided at each end of the debulking chamber 2. A circumferential chamber end flange 2a may extend outwardly from the debulking chamber 2 at each chamber opening 5. A vacuum port 10 and a pressure port and regulator 12 having a pressure gauge 13 may be disposed in fluid communication with the debulking chamber interior 3. A pressure safety valve 16 may also communicate with the debulking chamber interior 3.

A resilient or elastomeric pressure bladder 6 may be provided in the chamber interior 3 of the debulking chamber 2. The pressure bladder 6 may have a bladder interior 7 which is disposed in a fluid-tight seal with respect to the chamber interior 3. The pressure bladder 6 may also include an exterior bladder surface 6a which faces the debulking chamber interior 3 of the debulking chamber 2 and an interior bladder surface 6b which faces the bladder interior 7 of the pressure bladder 6. Each end of the pressure bladder 6 may have a bladder mouth 8 (one of which is shown) which communicates with the bladder interior 7. Each bladder mouth 8 of the pressure bladder 6 may correspond in orientation and position to the corresponding chamber opening 5 at each end of the debulking chamber 2. The pressure bladder 6 may be attached to the debulking chamber 2 in a fluid-tight seal according to any suitable technique which is known to those skilled in the art. For example and without limitation, a bladder anchor slot 4 may be provided in each chamber end flange 2a. Each end of the pressure bladder 6 may be anchored in the corresponding bladder anchor slot 4.

Figure 2:
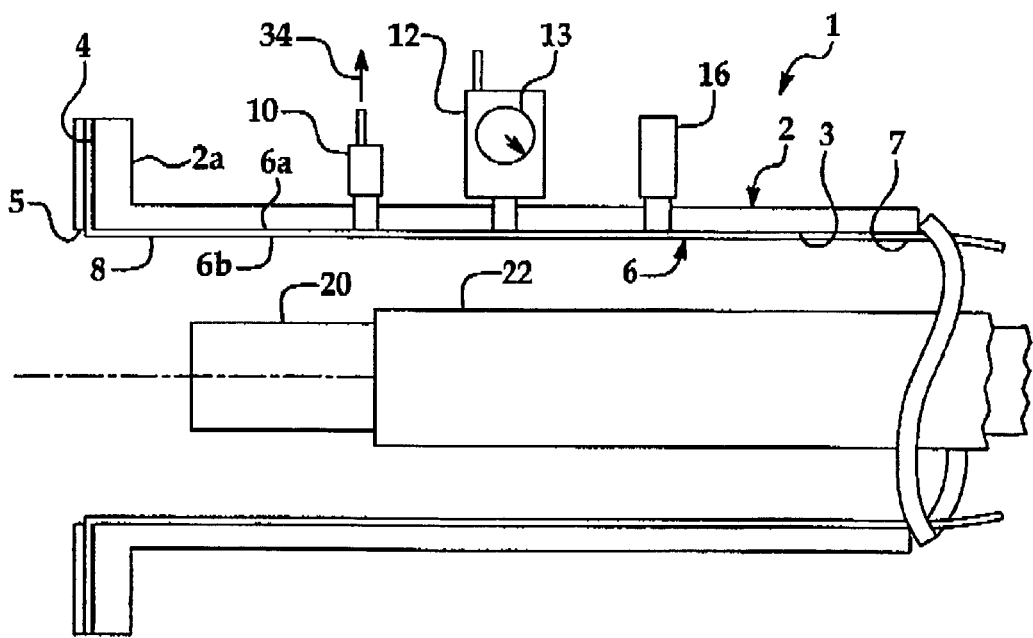
FIG. 2 is a partially schematic sectional view of the pressure debulking system, with a composite layup wound on a mandrel and extending into a debulking chamber of the pressure debulking system.

Referring next to FIGS. 2-5, in typical application of the system 1, a vacuum may be induced in the debulking chamber interior 3 of the debulking chamber 2, as shown in FIG. 2. This may be accomplished by releasing gas such as air, for example and without limitation, from the debulking chamber 2 through the vacuum port 10, as shown in FIG. 2. The vacuum induced in the debulking chamber interior 3 may expand the pressure bladder 6 and draw the exterior surface 6a of the pressure bladder 6 against the interior surface of the debulking chamber 2. This may provide optimum clearance for insertion of a composite layup 22 into the bladder interior 7 of the pressure bladder 6.

The composite layup 22 may be inserted into the bladder interior 7 of the pressure bladder 6 through the chamber opening 5 of the debulking chamber 2 and the bladder mouth 8 of the pressure bladder 6. The composite layup 22 may be wound in generally cylindrical form around a mandrel 20. The composite layup 22 may be a composite part such as a hat-shaped layup or a round or otherwise-shaped composite tube, for example and without limitation.

Figure 3:
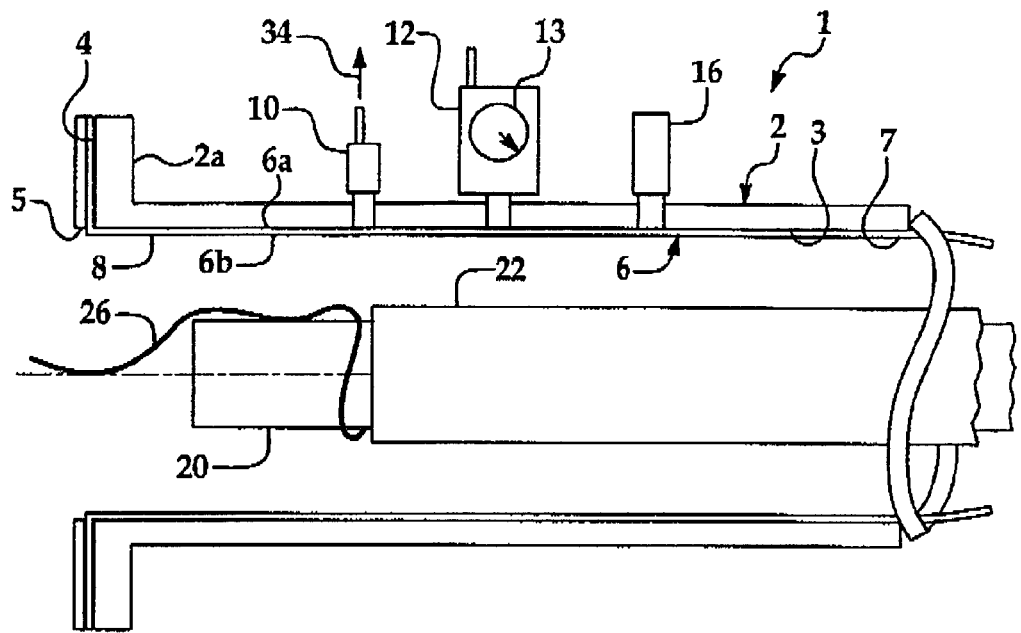
FIG. 3 is a partially schematic sectional view of the pressure debulking system, with the mandrel-wound composite layup extending into the debulking chamber and a breather string attached to the composite layup.

As shown in FIG. 3, a breather string or strip 26 may be applied to the composite layup 22. The breather string/strip 26 may extend from the bladder interior 7 of the pressure bladder 6 through the bladder mouth 8 and from the debulking chamber interior 3 through the chamber opening 5 of the debulking chamber 2.

Figure 4:
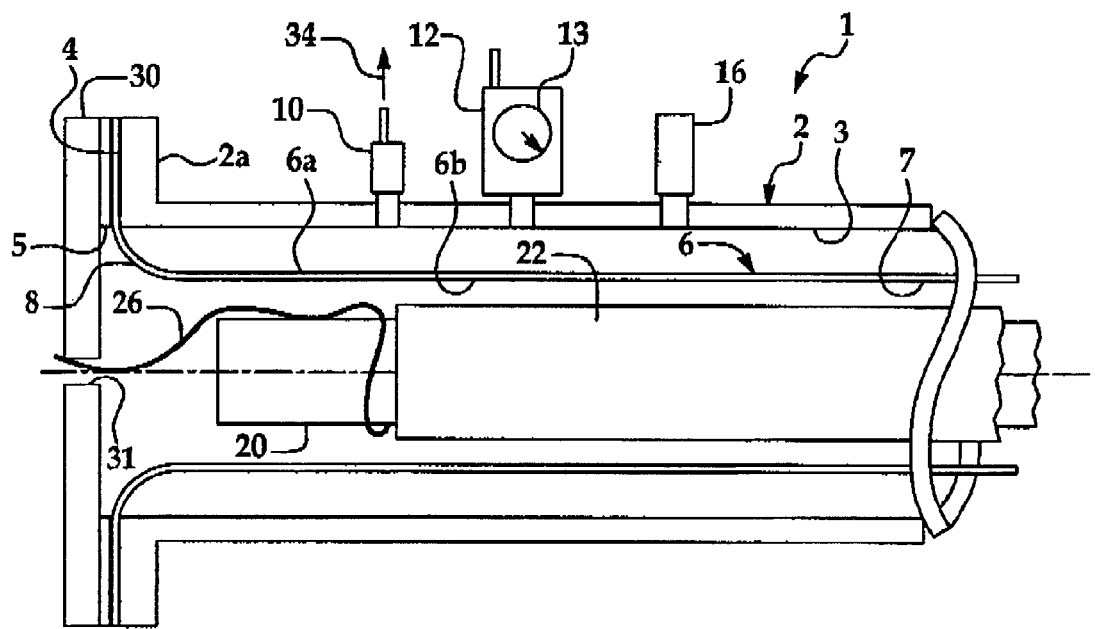
FIG. 4 is a partially schematic sectional view of the pressure debulking system, with an end plate closing an end of the debulking chamber.

As shown in FIG. 4, the vacuum in the debulking chamber interior 3 of the debulking chamber 2 may be released by terminating flow of the gas 34 (FIG. 3) from the debulking chamber interior 3 through the vacuum port 10. This may cause the pressure bladder 6 to relax and the exterior bladder surface 6a to disengage the interior surface of the debulking chamber 2. A chamber end plate 30 may be placed over each chamber opening 5 of the debulking chamber 2. A central plate opening 31 may extend through the chamber end plate 30. The breather string/strip 26 may extend through the plate opening 31.

Figure 5:
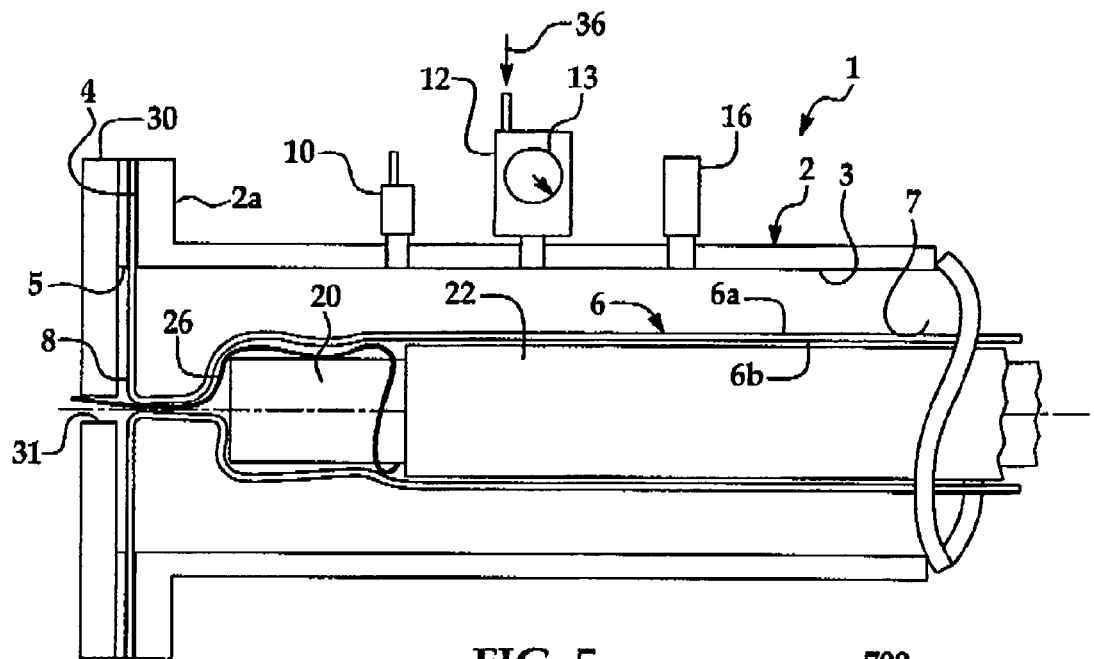
FIG. 5 is a partially schematic sectional view of the pressure debulking system, illustrating application of pressure to a pressure bladder of the system and application of the pressure bladder to the composite layup.

As shown in FIG. 5, pressure may be applied to the exterior bladder surface 6a of the pressure bladder 6 for a selected period of time. Application of pressure to the pressure bladder 6 may be accomplished by introducing a pressurized gas 36, such as air for example and without limitation, into the debulking chamber interior 3 of the debulking chamber 2 through the pressure port and regulator 12. Accordingly, the pressurized gas 36 may substantially fill the debulking chamber interior 3 and impinge against the exterior surface 6a of the pressure bladder 6 such that the interior bladder surface 6b of the pressure bladder 6 exerts pressure of corresponding magnitude against the composite layup 22. Therefore, the pressure bladder 6 may compress and debulk the composite layup 22. The magnitude of pressure which is exerted by the pressure bladder 6 against the composite layup 22 may correspond to the magnitude of pressure of the pressurized gas 36. This pressure may be selected by operation of the pressure port and regulator 12 and indicated by the pressure gauge 13 of the pressure port and regulator 12.

After a period of time which may be selected according to the debulking requirements of the composite layup 22, flow of the pressurized gas 36 into the debulking chamber interior 3 may be terminated to release the interior bladder surface 6b of the pressure bladder 6 from the exterior surface of the composite layup 22. The debulking process may be repeated as often as necessary based on the particular debulking requirements of the composite layup 22. Furthermore, the magnitude of pressure of the pressurized gas 36, and thus the magnitude of pressure of the pressure bladder 6 against the composite layup 22, may be adjusted throughout a range of possible pressures by operation of the pressure port and regulator 12. The pressure bladder 6 may be sized to eliminate wrinkling when expanded against the surface of the composite layup 22.

At the end of the debulking process, the composite layup 22 may be removed from the bladder interior of the pressure bladder 6. Accordingly, a vacuum may again be induced in the debulking chamber interior 3 to expand and draw the pressure bladder 6 against the interior surface of the debulking chamber 2 by flowing gas 34 (FIGS. 2 and 3) from the debulking chamber interior 3; the chamber end plate 30 may be removed from the chamber end flange 2a; and the mandrel 20 and debulked composite layup 22 thereon may be removed from the bladder interior 7 of the pressure bladder 6 through the bladder mouth 8 of the pressure bladder 6 and the chamber opening 5 of the debulking chamber 2.

Figure 6:
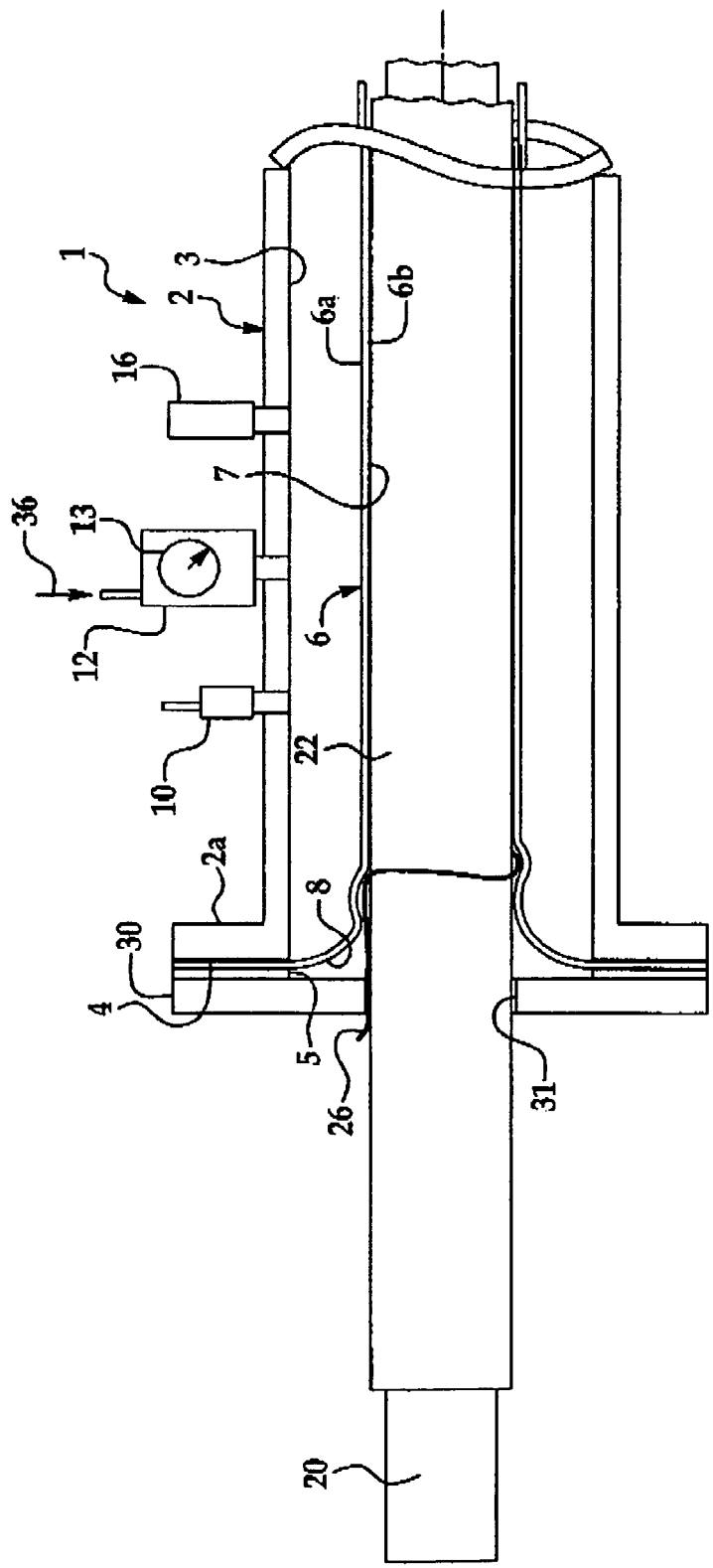
FIG. 6 is a partially schematic sectional view of the pressure debulking system, illustrating debulking of an elongated composite layup.

Referring next to FIG. 6, in some applications it may be necessary to debulk an elongated composite layup 22 the length of which may be incapable of being positioned entirely within the confines of the bladder interior 7 of the pressure bladder 6. Accordingly, a chamber end plate 30 having a plate opening 31 which is sized to accommodate the diameter or width of the composite layup 22 may be placed on the chamber end flange 2a of the debulking chamber 2. During the debulking process, which may be carried out as was heretofore described with respect to FIGS. 2-5, both the composite layup 22 and the breather string 26 may protrude from the debulking chamber 2 through the plate opening 31 of the chamber end plate 30.

Figure 7:
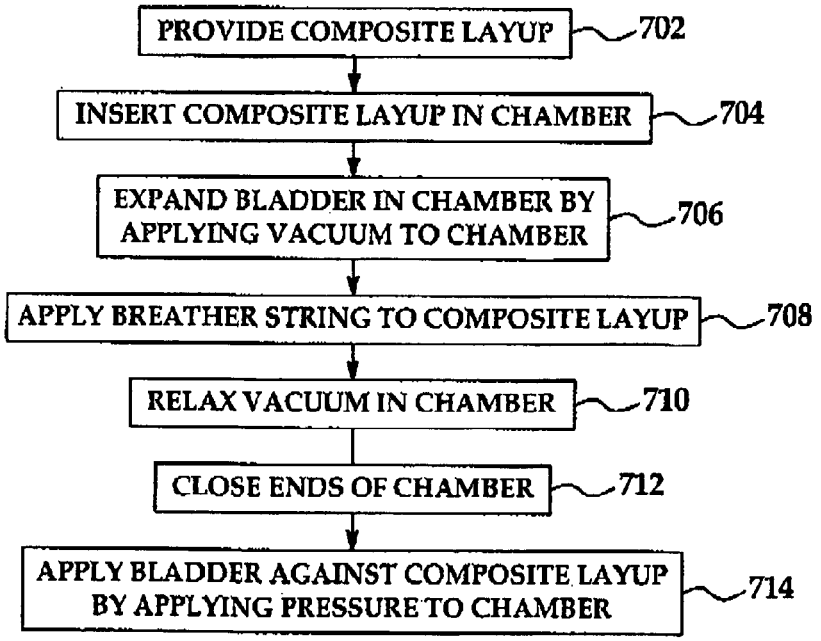
FIG. 7 is a flow diagram of an illustrative pressure debulking method.

Referring next to FIG. 7, a flow diagram 700 which illustrates an illustrative pressure debulking method is shown. In block 702, a composite layup may be provided. In block 704, a pressure bladder in the chamber may be expanded by inducing a vacuum in the chamber. In block 706, the composite layup may be inserted in a chamber. In block 708, a breather string may be applied to the composite layup. In block 710, the vacuum in the chamber may be relaxed. In block 712, the ends of the chamber may be closed. In block 714, the pressure bladder may be applied against the composite layup by applying pressure to the chamber. The composite layup may be removed from the chamber by reversing the steps in blocks 704-714.

Figure 8:
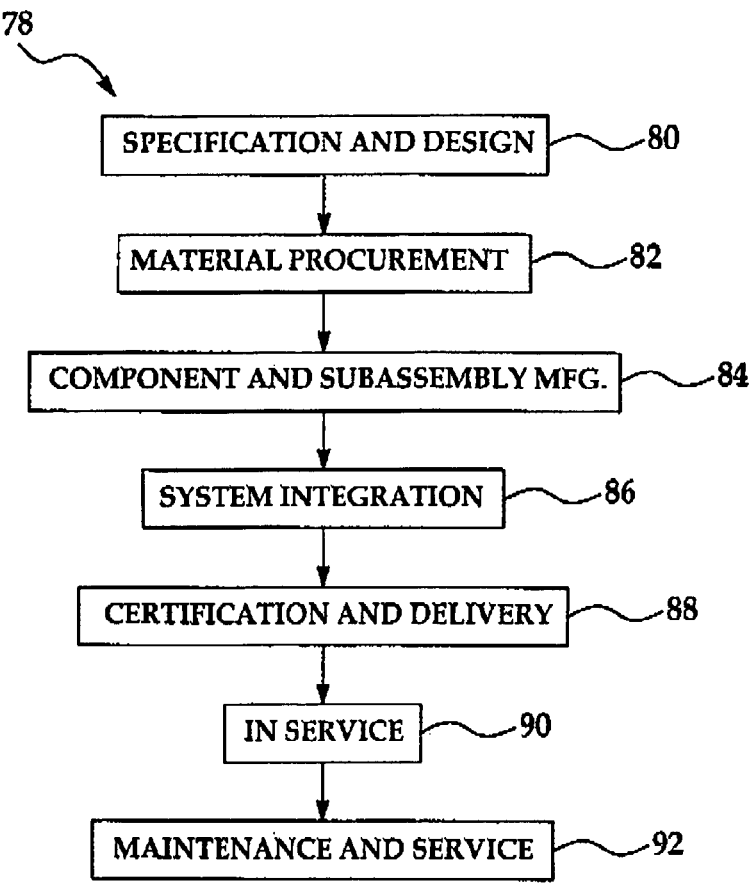
FIG. 8 is a flow diagram of an aircraft production and service methodology.
Figure 9:
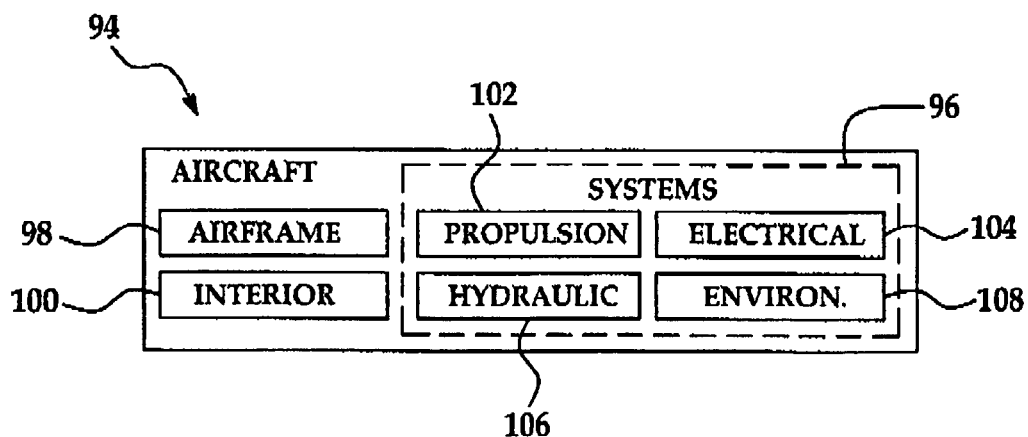
FIG. 9 is a block diagram of an aircraft.

Referring next to FIGS. 8 and 9, embodiments of the disclosure may be used in the context of an aircraft manufacturing and service method 78 as shown in FIG. 8 and an aircraft 94 as shown in FIG. 9. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A pressure debulking system, comprising:
   a debulking chamber having a debulking chamber interior that comprises a chamber opening that communicates with the debulking chamber interior that comprises a pressure bladder that comprises a bladder interior, such that the pressure bladder comprises an expanded position and a relaxed position;
   a vacuum port disposed in fluid communication with said debulking chamber interior, the vacuum port configured to receive a vacuum between the pressure bladder and the chamber such that the pressure bladder, in the expanded position, contacts an interior surface of the debulking chamber, and the vacuum port configured to release the vacuum such that the pressure bladder, in the relaxed position, being disengaged from the interior surface of the debulking chamber;
   a pressure port disposed in fluid communication with said debulking chamber interior, the pressure port configured to apply gas pressure to the pressure bladder such that when gas presses against the pressure bladder, an interior surface of the pressure bladder to encircles and presses against a mandrel positioned in the debulking chamber interior and within the pressure bladder; and
   an end plate positioned on the debulking chamber, such that the end plate comprises a central opening that comprises a size and shape such that the bladder remains inside the debulking chamber interior and allows a first portion of the mandrel to pass through the central opening and extend outside of the chamber while a second portion of the mandrel remains inside the chamber as the bladder encircles and maintains a compression on the second portion of the mandrel.

2. The system of claim 1 further comprising a pressure safety valve disposed in fluid communication with said debulking chamber interior.

3. The system of claim 1 further comprising a pressure gauge provided on said pressure port.

4. The system of claim 1 further comprising a chamber end flange provided on said debulking chamber at the chamber opening.

5. The system of claim 4 further comprising a bladder anchor slot provided in said chamber end flange and wherein said pressure bladder is anchored in said bladder anchor slot.

6. The system of claim 1 further comprising a breather string that communicates with said debulking chamber and extends through the chamber opening.

7. A pressure debulking system that comprises:
   a debulking chamber that comprises a debulking chamber interior and at least one chamber opening that communicates with said debulking chamber interior;
   a pressure bladder that comprises: a bladder interior provided in said debulking chamber interior, and at least one bladder mouth that communicates with said bladder interior at said at least one chamber opening, such that the pressure bladder comprises an expanded position and a relaxed position;
   a vacuum port disposed in fluid communication with said debulking chamber interior, the vacuum port configured to receive a vacuum between the pressure bladder and the chamber such that the pressure bladder, in the expanded position, contacts an interior surface of the debulking chamber, and the vacuum port configured to release the vacuum such that the pressure bladder, in the relaxed position, being disengaged from the interior surface of the debulking chamber;
   a pressure port disposed in fluid communication with said debulking chamber interior, the pressure port configured to apply gas pressure to the pressure bladder such that when gas presses against the pressure bladder, an interior surface of the pressure bladder encircles and presses against a mandrel positioned in the debulking chamber interior and within the pressure bladder; and
   an end plate positioned on the debulking chamber, such that the end plate comprises a central opening that comprises a size and shape such that the bladder remains inside the debulking chamber interior and allows a first portion of the mandrel to pass through the central opening and extend outside of the chamber while a second portion of the mandrel remains inside the chamber as the bladder encircles and maintains a compression on the second portion of the mandrel.

8. The system of claim 7 further comprising a pressure safety valve disposed in fluid communication with said debulking chamber interior.

9. The system of claim 7 further comprising a pressure gauge provided on said pressure port.

10. The system of claim 7 further comprising a chamber end flange provided on said debulking chamber at said at least one chamber opening.

11. The system of claim 10 further comprising a bladder anchor slot provided in said chamber end flange and wherein said pressure bladder is anchored in said bladder anchor slot.

12. The system of claim 7 further comprising a chamber end plate provided on said debulking chamber at said at least one chamber opening.

13. The system of claim 7 further comprising a breather string communicating with said debulking chamber and extending from said at least one chamber opening.

14. A pressure debulking system for debulking composite materials, comprising:
   a debulking chamber that comprises a debulking chamber interior and at least one chamber opening that communicates with said debulking chamber interior;
   a pressure bladder that comprises: a bladder interior provided in said debulking chamber interior, and at least one bladder mouth that communicates with said bladder interior at said at least one chamber opening, such that the pressure bladder comprises an expanded position and a relaxed position;
   a vacuum port disposed in fluid communication with said debulking chamber interior, the vacuum port configured to receive a vacuum between the pressure bladder and the chamber such that the pressure bladder, in the expanded position, contacts an interior surface of the debulking chamber, and the vacuum port configured to release the vacuum such that the pressure bladder, in the relaxed position, being disengaged from the interior surface of the debulking chamber;

a pressure port disposed in fluid communication with said debulking chamber interior, the pressure port configured to apply gas pressure to the pressure bladder such that when gas presses against the pressure bladder, an interior surface of the pressure bladder encircles and presses against a mandrel positioned in the debulking chamber interior, the mandrel being cylindrical; and an end plate sealing the chamber opening, wherein a composite layup is positioned on the mandrel, and the end plate is separate from the mandrel, such that the end plate comprises a central opening that comprises a size and shape such that the bladder remains inside the debulking chamber interior and allows a first portion of the mandrel and a breather string to pass through the central opening and extend outside of the chamber while a second portion of the mandrel remains inside the chamber as the bladder encircles and maintains a compression on the second portion of the mandrel.

15. The pressure debulking system of claim 14 further comprising the breather string extending from the composite layup through the end plate to an exterior of the chamber.

\* \* \* \* \*